(12) United States Patent
Morrill et al.

(10) Patent No.: US 7,936,550 B2
(45) Date of Patent: May 3, 2011

(54) FASTENING ASSEMBLY INCLUDING WASHER FOR SEALING THE ASSEMBLY FOR LIGHTNING STRIKE PROTECTION IN COMPOSITE STRUCTURES

(75) Inventors: Justin H. Morrill, Maple Valley, WA (US); Peter A. Coronado, Renton, WA (US); Daniel J. Kovach, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/834,272

(22) Filed: Jul. 12, 2010

(65) Prior Publication Data

US 2010/0277849 A1 Nov. 4, 2010

Related U.S. Application Data

(60) Division of application No. 11/769,785, filed on Jun. 28, 2007, now Pat. No. 7,755,876, which is a continuation-in-part of application No. 11/174,140, filed on Jul. 1, 2005, now Pat. No. 7,633,283.

(51) Int. Cl.
*H05F 3/00* (2006.01)
*H05F 1/02* (2006.01)

(52) U.S. Cl. ........................................... 361/218

(58) Field of Classification Search ............... 361/218
See application file for complete search history.

(56) References Cited

U.S. PATENT DOCUMENTS

| | | | |
|---|---|---|---|
| RE18,296 E | 12/1931 | Pierce | |
| 2,915,152 A | 12/1959 | Graham | |
| 3,054,620 A * | 9/1962 | Schwing | 277/574 |
| 3,640,590 A * | 2/1972 | Beisemann | 384/113 |
| 4,113,130 A | 9/1978 | Lazenby et al. | |
| 4,482,161 A * | 11/1984 | Izzi, Sr. | 277/606 |
| 4,755,904 A | 7/1988 | Brick | |
| 5,492,341 A * | 2/1996 | Pecht et al. | 277/400 |
| 6,241,444 B1 | 6/2001 | Clarke | |
| 6,280,092 B1 * | 8/2001 | Backus et al. | 384/425 |
| 7,530,757 B2 | 5/2009 | Toda et al. | |
| 7,633,283 B2 * | 12/2009 | Georgeson et al. | 324/72 |
| 7,755,876 B2 * | 7/2010 | Morrill et al. | 361/218 |
| 2010/0277849 A1 * | 11/2010 | Morrill et al. | 361/218 |

* cited by examiner

*Primary Examiner* — Ronald W Leja
(74) *Attorney, Agent, or Firm* — Law Office of Charles W. Peterson, Jr.

(57) ABSTRACT

A fastening assembly for a composite structure including a washer sealing the assembly for internal lightning strike protection. The washer includes one or more concentric ribs that are dielectric rings on both sides. When used (e.g., with a nut and bolt) internal to a structure, especially a composite structure, the washer seals the fastener hole (i.e., that the bolt passes through) and contains any sparking and hot gasses that may arise in the fastener hole from entering the structure.

20 Claims, 4 Drawing Sheets

FASTENING ASSEMBLY INCLUDING WASHER FOR SEALING THE ASSEMBLY FOR LIGHTNING STRIKE PROTECTION IN COMPOSITE STRUCTURES

CROSS REFERENCE TO RELATED APPLICATION

The present application is a divisional application of published U.S. Patent Application No. 2007/0258182, Ser. No. 11/769,785, "Fastening Assembly Including Washer For Sealing The Assembly For Lightning Strike Protection In Composite Structures," to Justin H. Morrill et al., filed Jun. 28, 2007; which is a continuation in part of U.S. Pat. No. 7,633,283, "Apparatus, System, and Method for Lightning Strike Protection and Verification of Dielectric Inserts," to Gary E. Georgeson et al., filed Jul. 1, 2005, all assigned to the assignee of the present application and incorporated herein by reference.

BACKGROUND OF THE INVENTION

1. Field of the Invention

The present invention generally relates to protecting composite structures and assemblies from lightning strikes, and more particularly, to protecting composite aircraft from arcing and internal sparking from lightning strikes.

2. Background Description

Increasingly, aircraft manufacturers are replacing aluminum in aircraft with carbon fiber composites that generally have a higher strength-to-weight ratio than aluminum. While, aluminum and other metals are highly conductive, a typical state of the art composite, such as Carbon Fiber Reinforced Plastic (CFRP), is much more resistive. Composite components are typically bolted to one another or to other non-composite (e.g., metal) components, e.g. a composites skin may be fastened or bolted to a frame (metal or composite).

A transient charge such as from a lightning strike to a body discharges into the body. So, when an airplane is struck by lightning, typically, the charge disperse as current flowing both through the skin and through the substructure. In a metal body the current from the discharge distributes relatively evenly over the metal body. In a composite structure the resistive composite surface may be attached by low resistance conductive metal fasteners that may or may not be attached to internal metal or sub-structure, e.g., structural spars for wings, fuselages, fuel tanks, and other components. The same charge disperses over an electrically irregular composite surface (i.e., large stretches of higher resistance composite surface interrupted by low resistance surface features such as fasteners) and discharge un-evenly.

So typically, in a composite structure current passes laterally from the fasteners through adjacent composite skin and enters the substructure through the fasteners and from the fasteners into sub-structure. A lightning strike in the immediate vicinity of a fastener, or actually to a fastener, produces a very high current density though the fastener. A fastener passing through a fastener hole in the skin may not contact the skin directly. The potential difference between the fastener and the fastener hole sidewall can cause sparks (e.g., from arcing) and hot gases in the hole that may eject from the fastener. Consequently, composite aircraft require additional and often costly lightning protection features, e.g., on the composite wing surface to manage the current path for such discharges and for preventing sparks and hot gases from entering the structure.

Spot facing is one approach to improving the pressure-containing seal for the hole. Spot bonding may be used in conjunction with spot facing and involves removing coatings from fastening hardware and related structure to ensure good electrical contact. However, spot facing is time consuming to apply to each location or even to selected locations. Spot bonding adds even more time. Other typical state of the art lightning protection approaches focus on diverting the resultant current and/or isolating conductive features from the current. Unfortunately, adding these lightning protection features negatively impact manufacturing cycle time, e.g., the time required to produce a wing or to fix the skin to the sub-structure.

Thus, there is a need to reduce or eliminate internal sparking and prevent hot gas from escaping into composite structures and especially, there is a need for a low cost easy to implement method for reducing and/or eliminating internal sparking and hot gasses within the fueled areas in composite aircraft.

SUMMARY OF THE INVENTION

Embodiments of the present invention include a washer, a fastening assembly including the washer and a composite structure including the washer sealing the assembly for internal lightning strike protection. The washer includes one or more concentric ribs that are dielectric rings on both sides. When used (e.g., with a nut and bolt) internal to a structure, especially a composite structure, the washer seals the fastener hole (i.e., that the bolt passes through) and contains any sparking and hot gasses that may arise in the fastener hole from entering the structure.

Advantageously, a preferred protected fastening assembly prevents current transfer and arcing, while allowing the voltage potential to build. When included during fastener assembly, a preferred dielectric ribbed washer electrically isolates the metal collar or nut from underlying metal or CFRP substructure. This prevents arcing fastener to substructure or skin or fastener collar to substructure that otherwise may result from a poor electrical contact there. Simultaneously, the preferred dielectric ribbed washer seals the fastener hole. Thus, a preferred dielectric ribbed washer serves to contain pressurized hot gases and particles within the fastener hole. This prevents the escape of volatile material into internal structures. Further, the simple discrete preferred washer is simple to produce. Thus, preferred fastener assemblies simplify manufacturability and improve manufacturing flow time compared, for example, to spot facing or spot bonding. Thus, a preferred fastener assembly provides robust lightning protection at reduced protection costs. Further, a preferred fastener assembly provides technically effective and cost effective lightning protection and in the event of lightning strike prevents internal sparking and arcing and gasses, e.g., from entering the fuel tank.

The features, functions, and advantages can be achieved independently in various embodiments of the present invention or may be combined in yet other embodiments.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1A:
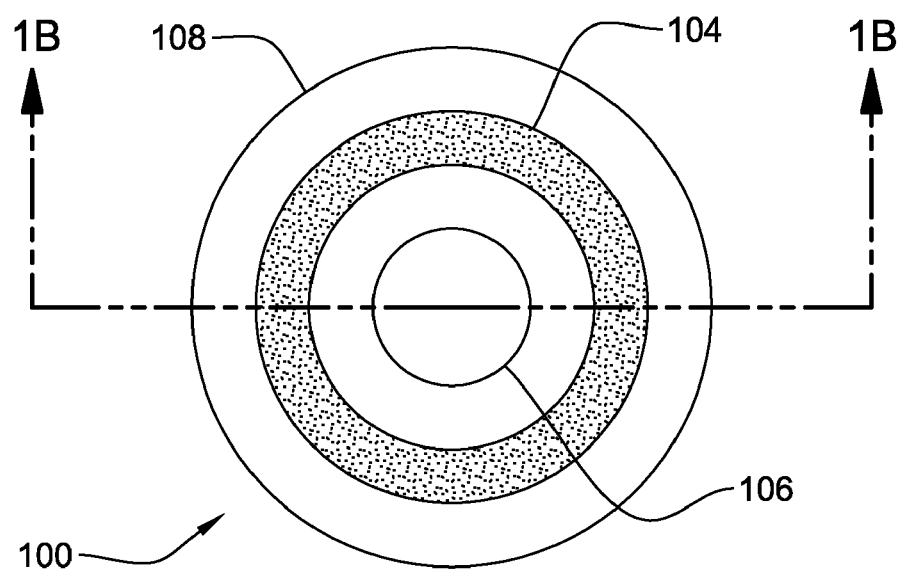
FIGS. 1A-B show an example in a plan view and a cross sectional view of a dielectric ribbed washer according to an advantageous embodiment of the present invention.
Figure 1B:
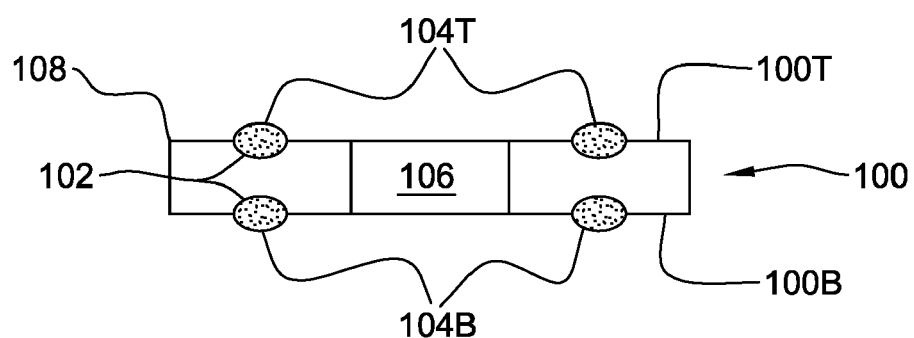

Turning now to the drawings and more particularly, FIGS. 1A-B show an example in a plan view and a cross sectional view through B-B, of a dielectric ribbed washer 100 according to an advantageous embodiment of the present invention. The blank washer, i.e., circular disk with a central orifice, has circular grooves 102 stamped, scribed or otherwise formed on both the top and bottom sides 100T, 100B. At least one soft, dielectric ring 104, 104T, 104B is formed (e.g., deposited) within the groves 102 on each side 100T, 100B and, preferably, pressed into place to hold the soft dielectric material in place prior to washer 100 installation.

While any soft dielectric material will suffice, preferably, the soft dielectric material is polyimide and has dielectric properties sufficient to withstand at least a forty volt (40V) potential discharge and more preferably, 1 MegaVolt per meter (1 MV/m). The grooves are formed at a depth 10-25% the thickness of the washer 100, and located for a single ring 104, substantially midway between the hole 106 and the outer perimeter/edge 108. Also, the blank washer may be coated with a dielectric, at least coating each of the top and bottom sides 100T, 100B. Preferably, the coating dielectric may be organic or inorganic, a resin or ceramic and has lubricating properties sufficient to prevent fretting between the washer and contact substrate. More preferably, the dielectric coating is also polyimide, deposited or otherwise applied to the blank washer, coating all surfaces 100T, 100B of the washer prior to forming the soft dielectric material rings 104, 104T, 104B.

This simple, discrete washer 100 can be used during assembly to electrically isolate a metal nut, for example, from underlying metal or CFRP substructure. Including a preferred dielectric ribbed washer 100 with a fastener in a composite structure prevents fastener or fastener collar to substructure arcing that otherwise may result from a poor electrical contact there. Simultaneously, the washer 100 seals the fastener hole to contain hot gasses and particles in the hole and prevent otherwise having the sparks and gasses escape into internal structures, e.g., in the vicinity of the fuel tank.

Preferably, a preferred dielectric ribbed washer 100 is included internally with each fastener, at least wherever composite skin is attached to underlying metal structure or substructure, and especially in sensitive areas such as where skin attaches to a fuel tank. Also, preferably the rings 104, 104T, 104B have sufficient height that when compressed in place, e.g., between a nut or other fastening sleeve and a structural component or the composite skin, the dielectric material squeezes radially in and out from the rings 104T, 104B as they flatten at structure-structure contact regions. A one half inch (½", 1.27 cm) outside diameter (OD) washer, for example, may have a one quarter inch (¼", 0.635 cm) inside diameter (ID) and may be 0.032" (0.081 cm) thick with a 0.020" (0.051 cm) rib height. As a result, in addition to sealing the fastener for pressure containment and for containing sparks, the structure-structure contact regions maintain appropriate fastener pre-load. A lightening strike in the vicinity of, or to, a fastener assembly may still create unwanted sparks and form gas that expands from within fastener holes. However, the preferred dielectric ribbed washer 100 seals the fastener hole to contain those sparks and hot gas within the hole and preventing the hot material from being expelled into the structure, e.g., in the vicinity of the fuel tank.

Figure 2A:
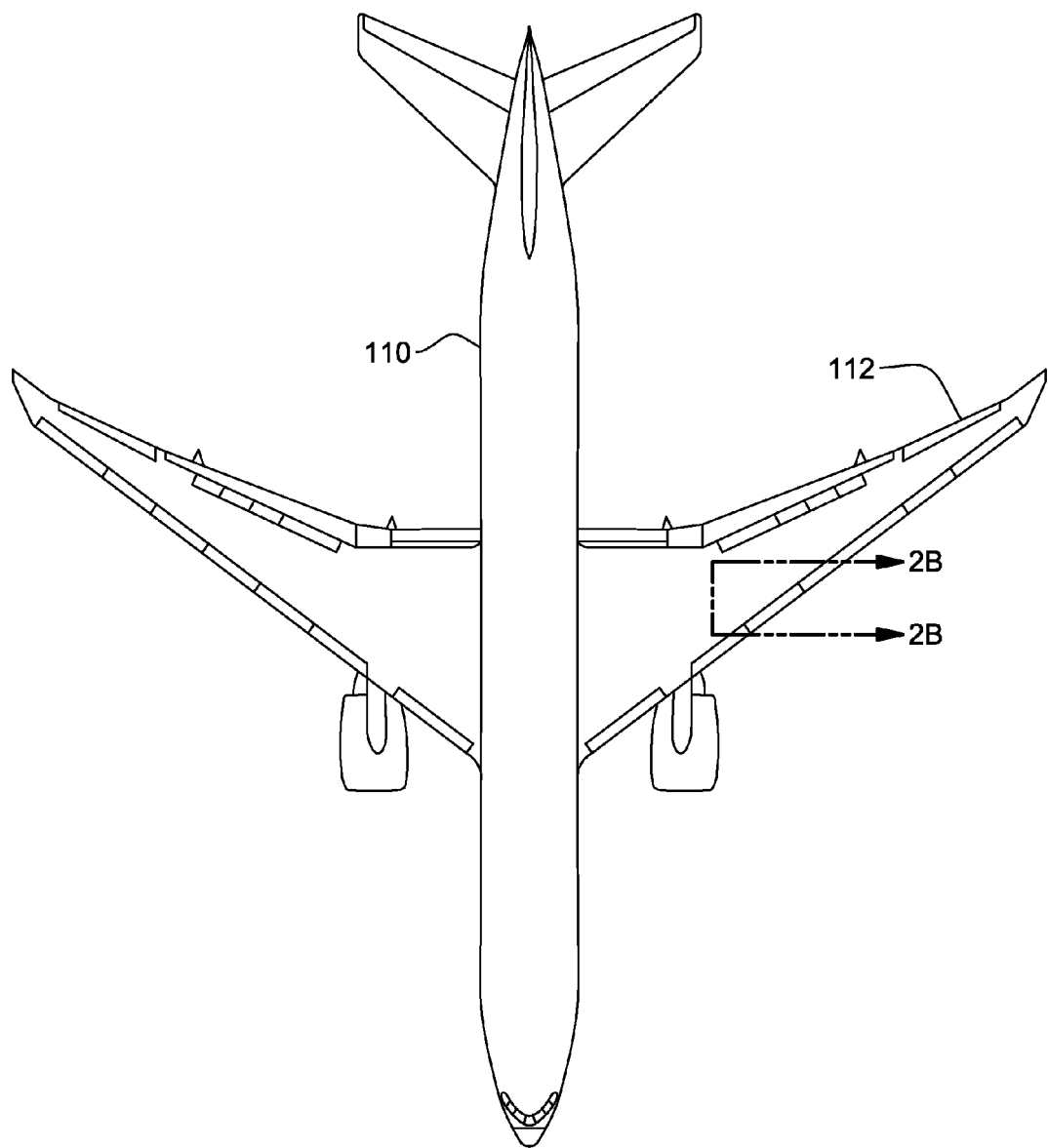
FIGS. 2A-C show an example of a composite structure (e.g., an aircraft), a cross-section of an area of the structure through B-B (e.g., though a wing fuel tank), and an expanded view at area C of one of the fastening assemblies protected with a preferred dielectric ribbed washer.
Figure 2B:
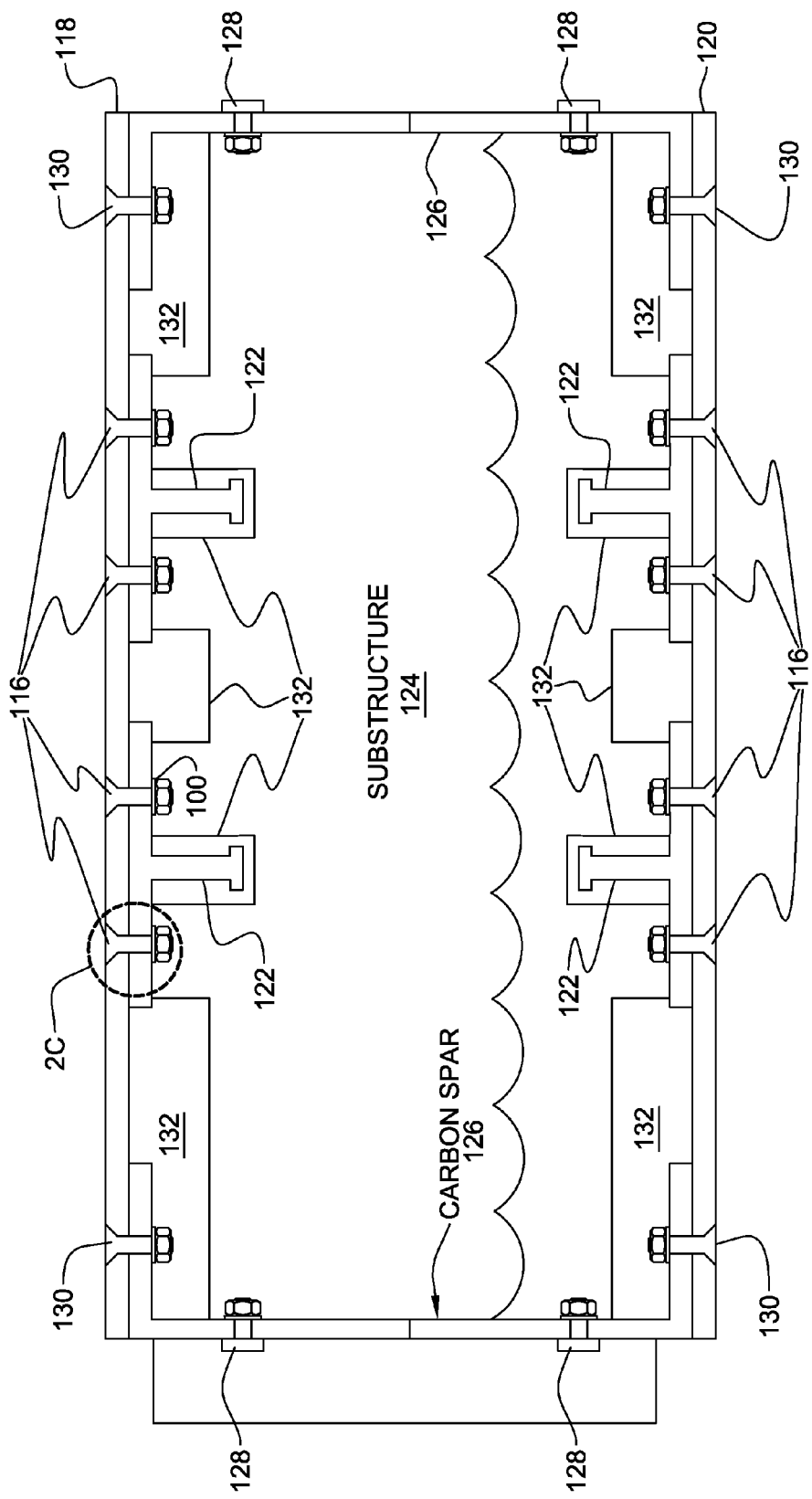
Figure 2C:
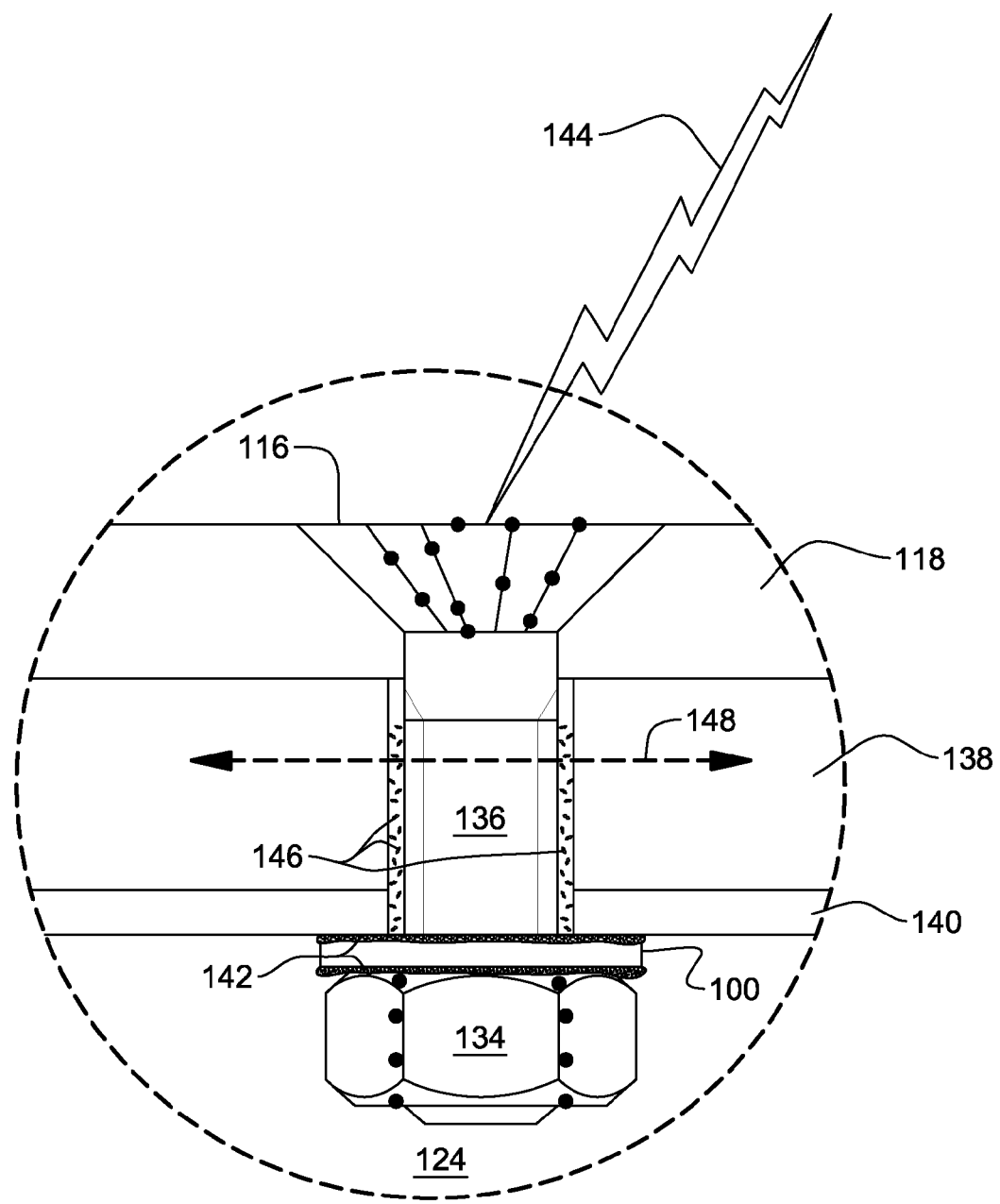

FIGS. 2A-C show an example of a composite structure (e.g., an aircraft 110), a cross-section of an area of the structure through B-B (e.g., though a wing 112 fuel tank 114), and an expanded view in more detail at area C showing fastening assembly 116 protected with a preferred dielectric ribbed washer 100. The wing includes a top skin 118 and bottom skin 120 attached by protected fastening assembly 116 through ribs 122 to a metal substructure 124. Carbon spars 126 form fore and aft wing fuel tank walls and attach to other structures, e.g., the ailerons. Fasteners 128 attaching the carbon spars 126 to the metal substructure 124 and 130 and connecting to other metallic or (in this example) non-metallic internal structures may or may not include a preferred dielectric ribbed washers 100. Gaps 132 in the metal substructure 124 allow fuel contained in the fuel tank to pass freely, e.g., from outboard wing sections to the engines. The fastening assembly 116 in this example includes a threaded sleeve or nut 134 and a fastener 136, such as a threaded bolt. In this example, the bolt 136 passes through a bolt hole in the skin 118, a rib flange 138 in a respective rib 122 and through a metal lip 140 or flange on metal substructure 124.

By contrast, with a typical state of the art unsealed fastener assembly, a lightning strike can cause internal sparks that escape or are expelled from the assembly/hole from two types of ignition sources. As noted hereinabove, arcing internally across a fastener or collar to the substructure can cause sparks; or sparks may result from current passing from the fastener to the composite skin wall of the hole. When the fastener or collar-to-substructure contact resistance is sufficiently low, current flows generally unimpeded without generating sufficient potential to the underlying conductive substructure (e.g., a metal spar or foil), high enough to arc. Even a mediocre electrical contact, however, can result in a high enough resistance that the path develops a higher potential difference, sufficient to cause arcing during a lightning strike. Similarly, current transferring between the fastener and the hole walls may generate a large amount of heat. If sufficient heat is generated, local metallic substructure, CFRP and sealant can heat past vaporization or pyrolization forming a very hot gas in the hole. With inadequate sealing, the hot, pressurized gas and sparks can escape the hole passing into the structure.

However, a preferred dielectric ribbed washer 100 between the nut 134 and metal lip 140 seals the bolt hole. Tightening the nut 134 during assembly, squeezes the dielectric material from radially the rings (104T, 104B in FIG. 1B) and flattens the soft dielectric at structure-structure contact regions 142. Thus, preferred washer 100 includes a high, thick dielectric coating between the nut 134 and substructure, both in the coating on the washer and in the dielectric material spread from the pressed dielectric rings 104. Although a lightning strike 144 may still generate hot gas and particles 146 in the bolt hole with current passing through adjacent composite (represented by arrows 148), the preferred washer 100 with flattened dielectric 142, prevents the hot gas and particles 146 from entering the structure.

So advantageously, a preferred protected fastening assembly prevents current transfer and arcing, while allowing the voltage potential to build. When included during fastener assembly, a preferred dielectric ribbed washer electrically isolates the metal collar or nut from underlying metal or CFRP substructure. This prevents arcing fastener to substructure or skin or fastener collar to substructure that otherwise may result from a poor electrical contact there. Simultaneously, the preferred dielectric ribbed washer seals the fastener hole. Thus, a preferred dielectric ribbed washer serves to contain pressurized hot gases and particles within the fastener hole. This prevents the escape of volatile material into internal structures. Further, the simple discrete preferred washer is simple to produce. Thus, preferred fastener assemblies simplify manufacturability and improve manufacturing flow time compared, for example, to spot face bonding or spot bonding. Thus, a preferred fastener assembly provides robust lightning protection at reduced protection costs. Further, a preferred fastener assembly provides technically effective and cost effective lightning protection and in the event of lightning strike prevents internal sparking and arcing and gasses, e.g., from entering the fuel tank.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A fastening assembly providing lightning strike protection internal to a composite structure, said fastener comprising:
   a fastener passing through a hole in at least one outer layer of a structure;
   a washer with concentric grooves in both sides, said fastener further passing through said washer;
   a sleeve, said fastener further passing through said sleeve, said sleeve fixed to said fastener against said washer and holding said fastener in place; and
   a soft dielectric material on both sides of said washer, said soft dielectric material filling each concentric groove and radiating outward and inward from said each concentric groove, wherein said hole is sealed internally by said washer and said soft dielectric material.

2. A fastening assembly as in claim 1, wherein said concentric grooves are midway between a central orifice and, the perimeter of, said washer.

3. A fastening assembly as in claim 1, wherein said concentric grooves have a depth and width at least one tenth (10%) of the washer thickness.

4. A fastening assembly as in claim 1, further comprising a dielectric material coating said washer.

5. A fastening assembly as in claim 4, wherein said dielectric material coating is a lubricating dielectric.

6. A fastening assembly as in claim 5, wherein said dielectric material coating is a ceramic coating.

7. A fastening assembly as in claim 5, wherein said dielectric material coating is a resin.

8. A fastening assembly as in claim 1, wherein said soft dielectric material is a polyimide capable of withstanding a forty volt (40V) discharge.

9. A fastening assembly as in claim 8, wherein said structure is an aircraft and said polyimide is capable of withstanding a one Megavolt per meter (1 MV/m) discharge.

10. A fastening assembly as in claim 9, further comprising polyimide coating said washer.

11. A method of providing lightning strike protection internal to a structure, said method comprising:
    passing fastener through a hole in at least one outer layer of a structure;
    passing said fastener through a washer with concentric grooves in both sides, a soft dielectric material bead on both sides of said washer, said soft dielectric material filling each concentric groove; and
    fixing a sleeve to said fastener, said sleeve being forced against said washer and holding said fastener in place, said soft dielectric material radiating outward and inward from said each concentric groove, wherein said hole is sealed internally by said washer and said soft dielectric material.

12. A method as in claim 11, wherein said structure comprises a composite structure and said soft dielectric material is a polyimide capable of withstanding a forty volt (40V) discharge.

13. A method as in claim 12, wherein said fastener includes threaded shaft, said washer is coated with a dielectric material coating and said sleeve is a threaded nut.

14. A method as in claim 13, wherein said dielectric material coating is polyimide and said polyimide is capable of withstanding a one Megavolt per meter (1 MV/m) discharge and fixing said nut comprises tightening said nut on the shaft of a bolt until said polyimide flattens against said nut on one side and an internal structure surface on the other side, sealing said hole internally.

15. A method as in claim 11, wherein said concentric grooves are midway between a central orifice and, the perimeter of, said washer and have a depth and width at least one tenth (10%) of the washer thickness.

16. A fastening assembly providing lightning strike protection internal to an aircraft, said fastener comprising:
    a fastener passing through a hole in at least one outer layer of the fuselage of an aircraft;
    a washer with a soft dielectric bead in concentric grooves in both sides, said washer internal to said aircraft, said fastener further passing through said washer; and
    a sleeve internal to said aircraft, said fastener further passing through said sleeve, said sleeve fixed to said fastener forced against said washer and holding said fastener in place, wherein said soft dielectric bead fills each concentric groove and is flattened radiating outward and inward from said each concentric groove such that said washer seals said hole internally.

17. A fastening assembly as in claim 16, wherein said fastener includes threaded shaft, said washer is coated with a dielectric material coating, said soft dielectric bead is polyimide and said sleeve is a threaded nut.

18. A fastening assembly as in claim 17, wherein said dielectric material coating is selected from the group comprising a lubricating dielectric, a ceramic coating, a resin and a polyimide.

19. A fastening assembly as in claim 17, wherein said polyimide is capable of withstanding a forty volt (40V) discharge.

20. A fastening assembly as in claim 19, wherein said at least one outer layer is one or more composite layer and said polyimide is capable of withstanding a one Megavolt per meter (1 MV/m) discharge.

* * * * *